WILLIAM M. WARREN.
Cattle Card.
No. 124,991. Patented March 26, 1872.
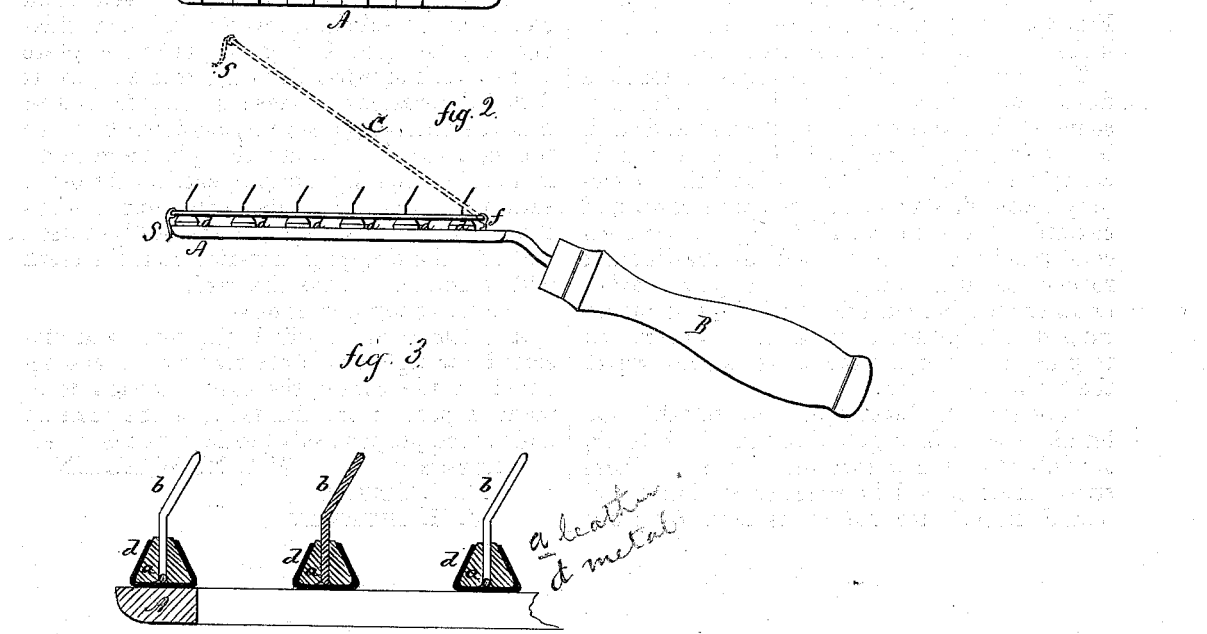

UNITED STATES PATENT OFFICE.

WILLIAM M. WARREN, OF WATERTOWN, CONNECTICUT.

IMPROVEMENT IN CATTLE CARDS.

Specification forming part of Letters Patent No. 124,991, dated March 26, 1872.

*To all whom it may concern:*

Be it known that I, WILLIAM M. WARREN, of Watertown, in the county of Litchfield and State of Connecticut, have invented a new Improvement in Cattle Card; and I do hereby declare the following, when taken in connection with the accompanying drawing and the letters of reference marked thereon, to be a full, clear, and exact description of the same, and which said drawing constitutes part of this specification, and represents, in—

Figure 1, a face or under-side view; Fig. 2, a side view illustrating the operation; and in Fig. 3 a partial transverse sectional view, enlarged to illustrate the construction.

This invention relates to an improvement in a device for cleaning cattle, and which possesses some of the features of both a comb and card, but which for convenience I term a "cattle card;" the object of the invention being to employ teeth similar to the common card, and combine therewith the advantages of an open comb; and it consists in inserting the different rows of teeth in independent strips of leather or other suitable material, and these strips arranged in longitudinal metal bars, constructed to grasp and support the material into which the teeth are inserted.

*a* are strips of leather or other suitable material, as seen in Fig. 3, through which teeth, *b*, similar to common card-teeth are set. These strips are inclosed in sheet or similar metal bars *d*, closed onto and so as to firmly grasp the material through which the teeth are set, and thus hold the teeth firmly in position and prevent their yielding, as in the common card. These bars are attached to a frame, A, which is formed from metal, and of about the size of an ordinary curry-comb or cattle card, to which said frame the handle B is attached in any convenient manner. This construction leaves a space between each row of teeth, and to this extent giving to the article the feature of a curry-comb, possessing the combined advantages of card and comb.

For the purpose of cleaning the teeth from hair or other substance which will unavoidably clog the teeth, I hinge a perforated plate or net-work of wire, C, to the frame A, as at *f*, the perforations or meshes being formed so that the plate or wires will pass down between the teeth to the bars; and this plate is secured in that position by a spring-catch, *s*, or other suitable device. By this arrangement when the teeth become clogged the plate C is raised and lifts the clogging material from the teeth and completely cleans the card.

I claim as my invention—

A cattle card, in which the teeth *b* are inserted through a suitable material, *a*, and secured in the bars *d*, the bars attached to or made a part of the frame A, in the manner and for the purpose substantially as described.

WM. M. WARREN.

Witnesses:
A. J. TIBBITS,
J. H. SHUMWAY.